US006386750B2

(12) United States Patent
Marelli

(10) Patent No.: US 6,386,750 B2
(45) Date of Patent: May 14, 2002

(54) PROCESS FOR PRODUCING EMULSIONS, PARTICULARY EMULSIONS OF LIQUID FUELS AND WATER, AND APPARATUS USED IN THE PROCESS

(75) Inventor: Ernesto Marelli, via Buttero, 20-23887 Olgiate Molgora (IT)

(73) Assignee: Ernesto Marelli, Olgiate Molgora (IT)

( * ) Notice: Subject to any disclaimer, the term of this patent is extended or adjusted under 35 U.S.C. 154(b) by 0 days.

(21) Appl. No.: 09/783,566

(22) Filed: Feb. 15, 2001

Related U.S. Application Data

(62) Division of application No. 09/314,071, filed on May 19, 1999, now Pat. No. 6,211,253.

(60) Provisional application No. 60/086,345, filed on May 20, 1998.

(51) Int. Cl.[7] .......................... B01F 15/04; G05D 11/02

(52) U.S. Cl. ................................ 366/152.1; 366/150.1; 366/182.1; 366/184; 366/336; 366/340; 516/53; 516/924; 44/301

(58) Field of Search ........................... 366/150.1, 152.1, 366/182.1, 184, 336, 340; 516/53, 924; 44/301

(56) References Cited

U.S. PATENT DOCUMENTS

| | | | | |
|---|---|---|---|---|
| 4,344,752 A | | 8/1982 | Gallagher | 431/354 |
| 4,430,251 A | | 2/1984 | Peterson et al. | 576/53 |
| 4,560,284 A | | 12/1985 | Chen | |
| 4,725,287 A | | 2/1988 | Gregoli et al. | 516/924 |
| 5,490,726 A | * | 2/1996 | Davis et al. | 366/152.1 |
| 5,563,189 A | * | 10/1996 | Hosokawa et al. | 339/295 |

FOREIGN PATENT DOCUMENTS

| | | |
|---|---|---|
| EP | 0 124 061 | 11/1984 |
| EP | 0 605 138 | 7/1994 |

* cited by examiner

*Primary Examiner*—Jacqueline V. Howard
(74) *Attorney, Agent, or Firm*—Finnegan, Henderson, Farabow, Garrett & Dunner, L.L.P.

(57) ABSTRACT

In a process for producing stable emulsions of at least two substantially immiscible fluids, particularly emulsions of a liquid fuel with water, a considerable increase in the efficiency of the emulsion-formation process is achieved by injecting the fluids to be emulsified into an emulsification chamber provided with an injection system which imparts to the fluids a motion in a direction which is substantially perpendicular to the general direction in which the fluids travel through the emulsification chamber. This injection system can be provided by means of a diffuser having an inlet hole, through which a stream of liquid is fed in a substantially axial direction, and at least one outlet hole, which leads into the chamber and whose axis lies on a plane which is substantially perpendicular to the direction of the inlet stream. In this manner, the stream strikes the walls of the emulsification chamber, producing a turbulent fluid motion which has a predominantly helical orientation and is capable of producing an efficient dispersion of one fluid in the other, forming dispersed-phase particles having an average diameter on the order of one micron or even less.

28 Claims, 3 Drawing Sheets

PROCESS FOR PRODUCING EMULSIONS, PARTICULARY EMULSIONS OF LIQUID FUELS AND WATER, AND APPARATUS USED IN THE PROCESS

This is a division of application Ser. No. 09/314,071, filed May 19, 1999 now U.S. Pat. No. 6,211,253 and claims the benefit of U.S. provisional application No. 60/086,345, filed May 20, 1998, all of which are incorporated herein by reference.

BACKGROUND OF THE INVENTION

The present invention relates to a process for producing stable emulsions of at least two substantially immiscible fluids, particularly emulsions of a liquid fuel with water, and to the apparatus used in the process.

In the present description and in the claims, the expression "emulsion of two substantially immiscible fluids" designates a heterogeneous system comprising a continuous phase, constituted by a first fluid (referenced to hereinafter as "primary fluid"), and a dispersed phase, constituted by a second fluid (referenced to hereinafter as "secondary fluid") which is substantially immiscible with the first fluid; said dispersed phase is in the form of particles (microdroplets) with an average size of less than 5 $\mu$m. This system can optionally be stabilized by adding a suitable surfactant or mixture of surfactants. The term "emulsion" is used here to also include the above heterogeneous systems in which the dispersed phase occurs in the form of particles having very small average dimensions, generally around 1.5 $\mu$m or less, for which the term "microemulsion" can also be used. The above definition also includes emulsions constituted by a plurality of primary fluids and/or by a plurality of secondary fluids, i.e., emulsions in which the dispersed phase and/or the continuous phase are constituted by mixtures of different products Emulsions or microemulsions of petroleum products and water, in which particular surfactants or mixtures of surfactants are used, are known in the art.

For example, U.S. Pat. No. 3,876,391 discloses water-in-petroleum type microemulsions which use a surfactant mixture constituted by a first surfactant which is soluble in the petroleum phase and a second surfactant which is soluble in the water phase, whereto a further water-soluble additive, for example an amide, an alkanolamine, a polyamine or an aldehyde, is added. U.S. Pat. No. 4,465,494 discloses microemulsions of liquid fuels with water which contain an alcohol or an amine and use a salt of an alkylphenoxyalkanoic acid as surfactant. A fuel emulsified with water is disclosed in EP-630 398 and is obtained by mixing the components in a static mixer in particular pressure and temperature conditions in the presence of a mixture of surfactants constituted by sorbitan oleate, a polyalkylene glycol, and an alkylphenoletoxylate.

In general, the use of surfactants or other additives such as those mentioned above can entail problems because they can be inherently toxic and/or corrosive with respect to the metals with which they make contact and because toxic byproducts can form during combustion. These drawbacks are particularly evident if nitrogen-containing and/or aromatic products are used. Moreover, on the basis of the Applicant's experience, emulsions of liquid fuels and water prepared according to conventional methods by adding suitable surfactants generally entail stability problems also in optimum storage conditions; accordingly, after some time an at least partial phase separation occurs which entails many drawbacks during the combustion process due to the nonhomogeneous condition of the fuel being fed.

EP-124 061 in the name of this same Applicant discloses an apparatus and a process for forming emulsions of fluid fuels with other immiscible fluids, particularly water. The described apparatus is constituted by a turbotransducer comprising an emulsification chamber in which the fluid fuel and the water are subjected to a combined mechanical and electromagnetic action which generates, inside said chamber, a collimated corridor through which the mixed fuel and water flow. The fluids enter the emulsification chamber through an injector which imparts a turbulent motion, with a predominantly axial orientation, to the fluids. This apparatus produces a fuel for feeding burners or the like which has high energy efficiency combined with a significant decrease in polluting emissions both in terms of particulate matter and of carbon monoxide.

EP-372 353 in the name of this same Applicant discloses a process for producing stabilized emulsions of a fuel, particularly a fuel for Diesel engines, and water, with the addition of a product acting as lubricant and antifreeze, for example sorbitol monoleate. This process entails premixing the fuel, the water and the additive and then passing the resulting mixture through a turbotransducer which is similar to the one disclosed in the above-cited EP-124 061. The resulting emulsion is stable and is suitable for storage in tanks; during combustion, it has high energy efficiency and reduced toxic emissions, particularly as regards nitrogen oxides, carbon monoxide and particulate matter.

The Applicant has observed that in some cases, particularly if low-density fuels are used, the process disclosed in EP-124 061 and EP-372 353 requires a plurality of passes of the emulsion through the apparatus or the use of a plurality of apparata in series in order to transfer to the system constituted by the two immiscible liquids an amount of energy that is sufficient to break the dispersed phase, i.e. usually the water phase, into particles having dimensions which ensure high performance in terms of emulsion stability and combustion uniformity. This fact entails relatively high energy consumption and decreases the productivity of the system.

Moreover, the Applicant has observed that poor efficiency in converting the energy associated with passage through the emulsion apparatus into surface energy of the particles of the dispersed phase, and therefore in forming very fine particles, entails an overheating of the resulting emulsion (for example to temperatures above 60° C.) which causes, in some conditions, evaporation of the lighter fractions of the fuel, with consequent loss of the fluid-dynamics stability of the system and possible irregularities or interruptions in the stream entering the turbotransducer due to cavitation in the pumping system.

The Applicant has now observed that a considerable increase in the efficiency of the emulsion-forming process can be achieved by injecting the fluids to be emulsified into an emulsification chamber provided with an injection system that imparts to the fluids a motion in a direction which is substantially perpendicular to the general direction of transit of said fluids through the emulsification chamber. This injection system can be provided by means of a diffuser provided with an inlet hole, through which a stream of liquid is fed in a substantially axial direction, and at least one outlet hole, which leads into the chamber and whose axis lies on a plane which is substantially perpendicular to the direction of the inlet stream. In this manner, the stream strikes the walls of the emulsification chamber, producing a turbulent motion of the fluids which has a predominantly helical orientation and is capable of providing efficient dispersion of one fluid in the other, forming particles of the dispersed phase having an average diameter on the order of one micron or even less.

In a first aspect, the present invention accordingly relates to a process for producing an emulsion of at least one primary fluid with at least one secondary fluid, said fluids being substantially mutually immiscible, which comprises feeding a stream of said fluids into an emulsification chamber provided with an inlet for said fluids and with an outlet for said emulsion, said inlet and said outlet being arranged along a main axis of said emulsification chamber, obtaining a stream of the emulsified fluids at the outlet;

characterized in that said process comprises imparting to the stream of said fluids that enter the emulsification chamber a motion in a direction which is substantially perpendicular to said main axis of the emulsification chamber.

In a preferred embodiment of the present invention, said process comprises imparting to the stream of said fluids entering the emulsification chamber initially a motion in a direction which is substantially parallel to the main axis and then a motion in a direction which is substantially perpendicular to the main axis.

According to a preferred aspect, said process further comprises conveying the stream of said emulsion leaving the emulsification chamber so as to achieve initially stream motion in a direction which is substantially perpendicular to the main axis and then stream motion in a direction which is substantially parallel to the main axis.

In a preferred embodiment, said process further comprises premixing the primary fluid with the secondary fluid and then feeding the resulting mix into the emulsification chamber.

In the present description and in the claims, the term "stream motion" defines the predominant component of the motion of the fluid threads that constitute the stream, which have a substantially turbulent orientation. This predominant component determines the general direction of stream motion.

In the present description and in the claims, the expression "direction which is substantially perpendicular to an axis" means a direction which forms, with respect to said axis, an angle between 70° and 110°, preferably between 80° and 100°.

In the present description and in the claims, the expression "direction which is substantially parallel to an axis" means a direction which forms, with respect to said axis, an angle between −20° and +20°, preferably between −10° and +10°.

According to a preferred embodiment of the present invention, the primary fluid and the secondary fluid are premixed by feeding a stream of the primary fluid and a stream of the secondary fluid into a premixing chamber which is provided with an inlet for the primary fluid, an inlet for the secondary fluid and an outlet for the mixture, said outlet being connected to the emulsification chamber. Preferably, said outlet and at least one of said inlets are arranged along a main axis of said premixing chamber.

According to a preferred aspect, the step of feeding the primary fluid stream and the secondary fluid stream into the premixing chamber comprises imparting motions to the two streams in substantially mutually perpendicular directions.

According to a preferred aspect, in the premixing chamber the inlet for the primary fluid and the outlet for the mixture are arranged along said main axis, while the inlet for the secondary fluid is arranged along a secondary axis of said premixing chamber which is substantially perpendicular to said main axis. According to this last embodiment, the feeding of the stream of primary fluid preferably comprises imparting to said primary fluid stream a motion in a direction which is substantially parallel to said main axis, while the feeding of the stream of secondary fluid comprises imparting to said secondary fluid stream a direction of motion which is substantially perpendicular to said secondary axis.

According to another preferred aspect, the process for producing the emulsion according to the present invention is performed in the presence of a magnetic field generated inside the emulsification chamber.

According to another aspect, the present invention relates to an apparatus for producing an emulsion of at least one primary fluid with at least one secondary fluid, said fluids being substantially immiscible with each other, said apparatus comprising an emulsification chamber provided with an inlet for said fluids and an outlet for said emulsion, said inlet being arranged along a main axis of said emulsification chamber; characterized in that said inlet comprises a diffuser provided with an inlet hole whose axis is substantially parallel to said main axis and an outlet hole whose axis is substantially perpendicular to said main axis.

According to a preferred embodiment of the present invention, said diffuser comprises a hollow cylindrical body; on the side wall of said cylindrical body through holes are provided which have a radial axis, and said cylindrical body has an end which is connected to said inlet and another end which is closed.

According to another preferred aspect, at the outlet of the emulsification chamber a conveyance device for the emulsion is provided, which has an inlet hole whose axis is substantially perpendicular to the main axis of the emulsification chamber and an outlet hole whose axis is substantially parallel to said main axis.

According to another preferred aspect, said conveyance device comprises a hollow cylindrical body; on the side wall of said cylindrical body through holes are provided which have a radial axis, and said cylindrical body has one end which is connected to said outlet and another end which is closed.

According to a preferred embodiment of the present invention, said diffuser and said conveyance device are arranged along the main axis of the emulsification chamber in a mirror-symmetrical position with respect to each other.

According to a further preferred aspect, the internal surface of the emulsification chamber is cylindrical and has a helical groove which has a predetermined depth and pitch.

The depth and the pitch of the groove are predetermined mainly as a function of the rheological characteristics of the fluids and of the flow parameters of the system.

According to a preferred aspect, the apparatus according to the present invention further comprises a premixing chamber provided with an inlet for the primary fluid, an inlet for the secondary fluid and an outlet for the resulting mixture, said outlet being connected to the inlet of the emulsification chamber. Preferably, the outlet for the mixture and the inlet for the primary fluid are arranged along a main axis of said premixing chamber, while the inlet for the secondary fluid is arranged along a secondary axis of said premixing chamber which is substantially perpendicular to said main axis. Even more preferably, said secondary fluid inlet comprises a diffuser provided with an inlet hole whose axis is substantially parallel to said secondary axis and an outlet hole whose axis is substantially perpendicular to said secondary axis.

According to a preferred aspect, the apparatus according to the present invention further comprises a compensation chamber provided with an inlet and an outlet which are arranged along a main axis of said compensation chamber, said inlet being connected to the emulsion outlet of the emulsification chamber. The compensation chamber is mainly meant to absorb any pulses of the output stream caused by the fluid pumping system. Preferably, the outlet of said compensation chamber has a conveyor which comprises a substantially cylindrical hollow body having an open end and another end which is provided with a perforated plate arranged perpendicularly to the main axis of the compensation chamber. Preferably, the inlet of said compensation chamber is provided with a diffuser which has an inlet hole whose axis is substantially parallel to said main axis and an outlet hole whose axis is substantially perpendicular to said main axis.

According to another aspect, the present invention relates to a system for producing an emulsion of at least one primary fluid with at least one secondary fluid, said system comprising:

(a) an apparatus for producing the emulsion, said apparatus comprising an emulsification chamber provided with an inlet for said fluids and with an outlet for the resulting emulsion, said inlet being arranged along a main axis of said emulsification chamber;

(b) devices for pumping the primary fluid and the secondary fluid into the apparatus;

(c) devices for extracting the emulsion that leaves the apparatus;

characterized in that said inlet of the emulsification chamber comprises a diffuser provided with an inlet hole whose axis is substantially parallel to said main axis and an outlet hole whose axis is substantially perpendicular to said main axis.

According to a particular embodiment, said system further comprises an accumulation tank for the produced emulsion.

According to another aspect, the present invention relates to a process for the production and combustion of an emulsion of a liquid fuel and water, comprising the steps of:

(a) producing the emulsion of the liquid fuel and the water;

(b) feeding said emulsion into an emulsion combustion device;

(c) performing combustion of the emulsion;

characterized in that the emulsion is produced by feeding a stream of liquid fuel and water into an emulsification chamber, so as to impart to said stream a motion in a direction which is substantially perpendicular to the general direction in which the stream passes through the emulsification chamber, with a supply pressure which produces an emulsion having predetermined characteristics in terms of dispersion of the water in the fuel.

In a first embodiment, in said production and combustion process the emulsion produced in step (a) is sent directly to the emulsion combustion device.

In another embodiment, in said production and combustion process the emulsion produced in step (a) is first sent to an accumulation tank and then fed to the emulsion combustion device.

The process according to the present invention allows to produce emulsions of liquid fuels and water in which the water is dispersed in the liquid fuel with predetermined dispersion characteristics, particularly as regards the average size of the dispersed water particles. It is believed that this characteristic is decisive in achieving a combustion of high quality in terms of both energy efficiency and polluting emission reduction. In particular, it is believed that high-quality combustion can be achieved with an average size of the water particles dispersed in the liquid fuel of generally less than 1.5 $\mu$m, preferably between 0.05 and 1 $\mu$m. Moreover, the dispersion characteristics of the water in the liquid fuel directly affect the stability of said emulsion, which is a particularly critical property in the case of low-density liquid fuels (for example Diesel fuels), for which storage in tanks, also for long periods, is usually required. The stability of the resulting emulsions can be evaluated on the basis of any phase separations found after centrifuging a sample of the emulsion at a predetermined speed and for a predetermined time. It is believed that the emulsions of liquid fuels and water have a stability which is sufficient to allow to store them for long periods (more than 1 month) if they show substantially no phase separation after centrifuging at 1000 g (g=acceleration of gravity) for 15 minutes (at room temperature).

Further characteristics and advantages will become apparent from the detailed description of an embodiment of the apparatus according to the present invention. Said description is given hereafter with reference to the accompanying drawings, wherein.

Figure 1:
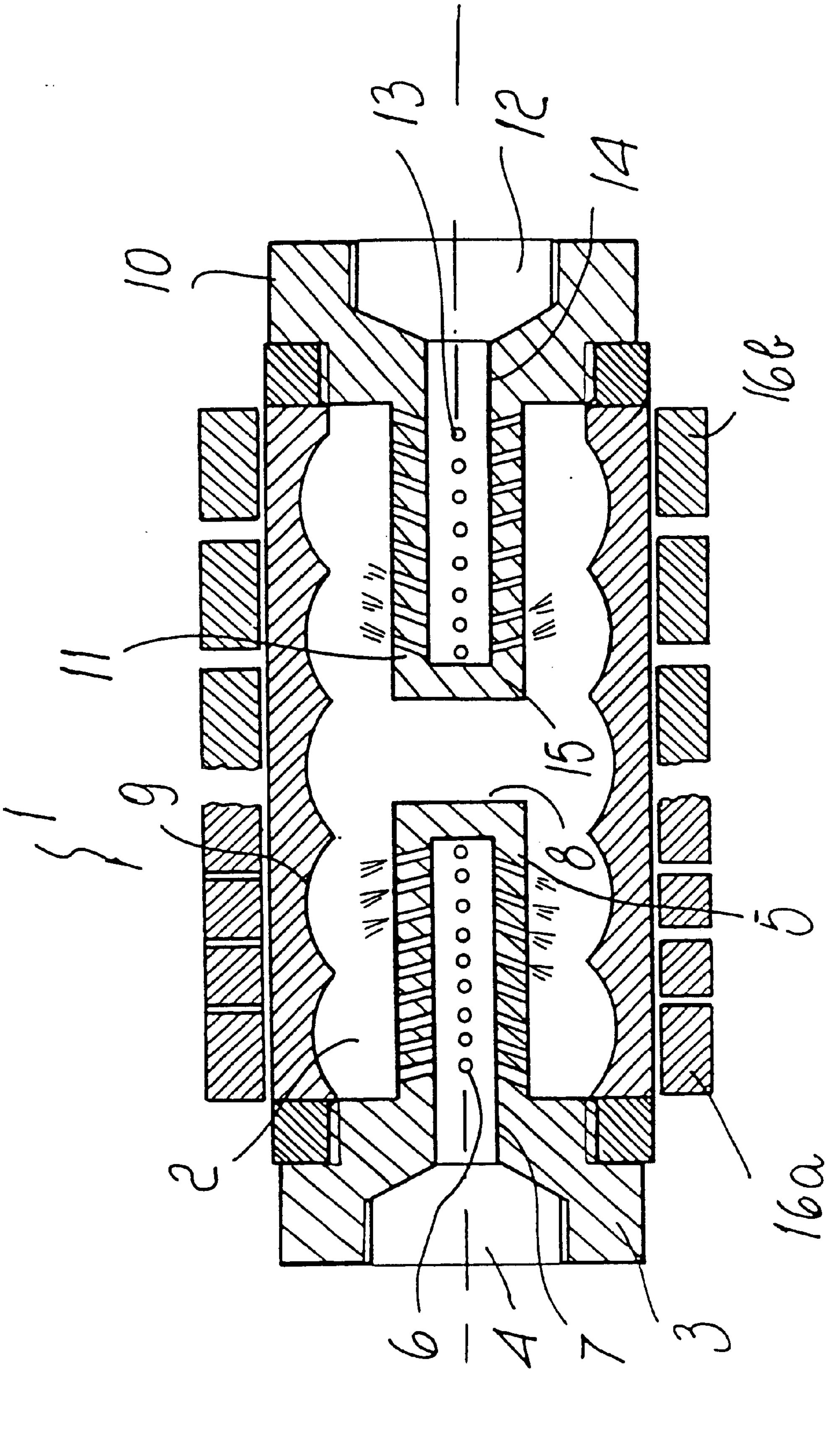
FIG. 1 is a longitudinal sectional view of the emulsification chamber.

With reference to FIG. 1, the emulsification chamber 1 is provided with a substantially cylindrical through hole 2 whose axis lies along a main axis of the chamber 1. The dimensions of the through hole 2, and therefore the internal volume of the emulsification chamber 1, are determined mainly as a function of the emulsion capacity to be achieved. Typically, the through hole 2 has a length of 80 to 1800 mm and a diameter of 30 to 800 mm, with a nominal capacity between 50 kg/hour and 120 tons/hour for fuel emulsions with a viscosity of less than 3° E (at 50° C). The size indications given in the present description are of course given only by way of indication and can be changed according to the specific rheological characteristics of the fluids to be emulsified and according to the type of emulsion to be produced.

A diffuser 3 is arranged at one of the ends of the through hole 2 and comprises a cylindrical hollow body 5 and preferably an inlet chamber 4 which is also generally substantially cylindrical and is connected to one end of the cylindrical body 5, preferably by means of a frusto-conical connecting portion. The transverse cross-section of the cylindrical body 5 is smaller than the transverse cross-section of the through hole 2, so that the diffuser 3 enters the emulsification chamber 1 for the entire length of the cylindrical body 5. On the side wall of the cylindrical body 5 through holes 6 are provided which have a radial axis. One end 7 of the cylindrical body 5 is connected to the inlet chamber 4, while the other end 8 is closed. Typically, the cylindrical body 5 has an outside diameter between 10 and 300 mm and a length of 30 to 800 mm. The diameter of each through hole 6 is predetermined as a function both of the type of fluid that is fed, particularly its viscosity, and of productivity and therefore of the emulsion capacity to be achieved. Said diameter is generally between 1 and 35 mm, preferably between 2 and 25, while the number of holes 6 provided in the cylindrical body 5 is generally between 10 and 40, preferably between 14 and 28. Preferably, the through holes 6 are arranged along at least two, preferably three or four, generatrices of the cylindrical body 5 which are arranged symmetrically with respect to the axis of the cylindrical body 5.

The axis of each through hole 6 is substantially perpendicular to the axis of the cylindrical body 5. The expression "substantially perpendicular" means that the axis of each through hole forms, with respect to a plane perpendicular to the axis of the cylindrical body, an angle between −20° and +20°, preferably between −10° and +10°.

Preferably, the axis of the through holes 6 is inclined towards the inlet of the emulsification chamber 1. It is believed that in this way the efficiency of the apparatus and the fluid dispersion characteristics are improved by means of an increase in the degree of turbulence and in the retention time of the fluids in the emulsification chamber without however creating "dead spots" in which fluids stagnate.

A helical groove 9 is preferably provided on the surface of the through hole 2 of the emulsification chamber 1; its depth and pitch are predetermined according to the characteristics of the fluids and to the flow parameters of the system.

The presence of the helical groove 9 facilitates the onset of a turbulent motion of the fluids which has a predominantly helical orientation and also prevents the accumulation of solid residues in the emulsification chamber, thus avoiding the formation of sediments or sludge which would hinder the flow of the fluids through the apparatus and reduce the quality of the produced emulsion over time. The depth and the pitch of the helical groove are predetermined according to the dimensions of the emulsification chamber, to the capacity and therefore to the productivity of the system, and to the chemical and physical characteristics of the emulsified fluids. Typically, the groove 9, which generally has a substantially U-shaped or V-shaped profile, has a depth of 1 to 5 mm, preferably 1.5 to 3 mm, while the pitch is generally between 2 and 10 mm, preferably between 4 and 8 mm.

At the other end of the through hole 2 a conveyance device 10 is provided for the emulsion that leaves the emulsification chamber; the structure of said device is preferably similar to the diffuser 3, and said device is arranged along the main axis of the chamber 1 in a mirror-symmetrical position with respect to the diffuser 3. The conveyance device 10 comprises a hollow cylindrical body 11 and, preferably, an outlet chamber 12 which is also generally substantially cylindrical and is connected to an end of the cylindrical body 11, preferably by means of a frustoconical connecting portion. The transverse cross-section of the cylindrical body 11 is smaller than the transverse cross-section of the through hole 2, so that the conveyance device 10 penetrates in the emulsification chamber 1 for the entire length of the cylindrical body 11. On the side wall of the cylindrical body 11 through holes 13 are provided which have a radial axis. One end 14 of the cylindrical body 11 is connected to the outlet chamber 12, while the other end 15 is closed. The dimensions of the conveyance device 10 and the number and arrangement of the through holes 13 are substantially the same as those cited above for the diffuser 3.

In a preferred embodiment, passage of the premixed fluids inside the emulsification chamber 1 is preferably performed in the presence of a magnetic field.

According to the Applicant, said magnetic field is mainly meant to avoid accumulation, precipitation and deposition on the chamber surface of the salts that are normally present in the water used as a secondary fluid, which can arise from the intrinsic hardness of the water and from the addition of additives, particularly hydroxides or salts which are suitable to reduce the emission of sulfur oxides (as explained hereinafter). It is in fact believed that the action of the applied magnetic field modifies the crystalline structure of the salts so as to hinder their aggregation and adhesion to metal surfaces.

The Applicant also believes that the presence of a magnetic field inside the emulsification chamber can, in some cases, appreciably improve the quality of the produced emulsion, especially in terms of stability. As shown in the examples provided hereinafter, the Applicant has in fact observed that the emulsions produced by means of the process according to the present invention generally have high stability and substantially no phase separation also after prolonged centrifuging at high speed. In some cases, however, and particularly in the case of emulsions based on low-density liquid fuels (for example Diesel fuels), after prolonged centrifuging it is possible to note that a small amount of emulsion, similar in structure to the initial emulsion but richer in the water phase, has stratified. If the emulsion is produced in the presence of a magnetic field, the stratification rate is significantly reduced with respect to emulsions produced with the same apparatus with no magnetic field applied. Accordingly, in practical use, emulsions, and particularly emulsions based on low-density fuels, produced in the presence of a magnetic field are believed to be more stable and to maintain their initial homogeneity characteristics also after prolonged storage in a tank. It should be observed, in any case, that the part of emulsion richer in water phase that tends to separate after centrifuging can be easily rehomogenized by bland mechanical agitation.

When said magnetic action is required, devices 16*a,* 16*b* suitable to generate a magnetic field inside the emulsification chamber 1 are therefore placed around said chamber. It is possible to use, for this purpose, an electromagnet or a plurality of mutually parallel-connected electromagnets 16*a*. As an alternative to the electromagnets, or in combination therewith, it is also possible to use permanent magnets 16*b* which can be made of lanthanum oxide or alloys thereof. The strength of said electromagnets and/or permanent magnets is predetermined so as to obtain, inside the emulsification chamber, a magnetic field strength generally between 7000 and 15000 kOe (kilo Oersted), preferably between 9000 and 12000 kOe (1 Oe=79.5 A/m). It is advantageously possible to use pressure die-cast and sintered lanthanum oxide permanent magnets with densities up to 7.0–7.5 g/cm$^3$, optionally mixed with light alloys, having a strength of up to 3540 MGs.Oe.

Figure 2:
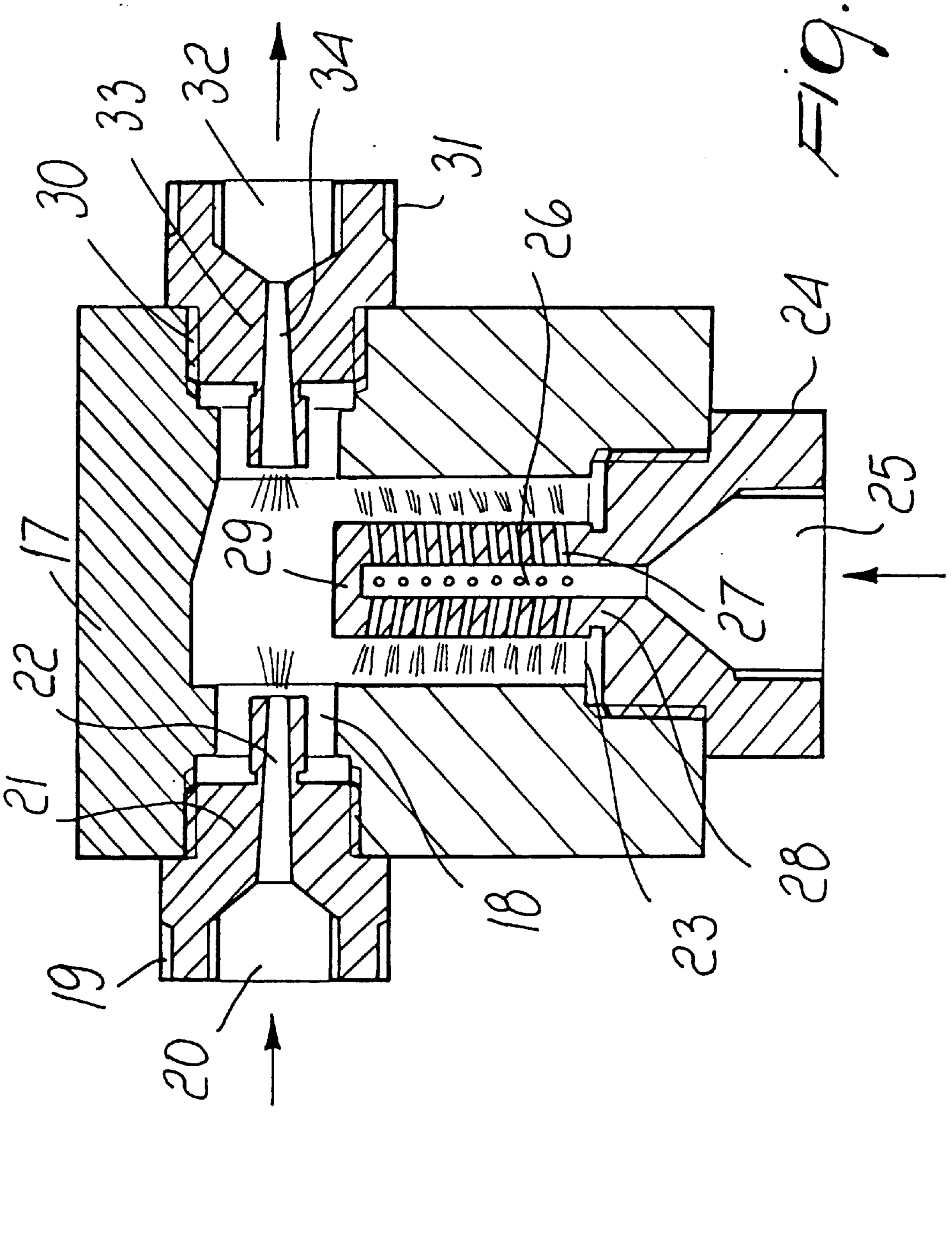
FIG. 2 is a longitudinal sectional view of the premixing chamber.

With reference to FIG. 2, the premixing chamber 17 has an inlet hole 18 for the primary fluid, an inlet hole 23 for the secondary fluid and an outlet hole 30 for the resulting mixture. In a preferred embodiment, the inlet hole 18 and the outlet hole 30 are arranged so that their axis lies along a main axis of the premixing chamber 17, while the axis of the inlet hole 23 is arranged along a secondary axis of the chamber 17 which is substantially perpendicular to the main axis.

The inlet hole 18 is preferably provided with an injector 19 which produces, for the primary fluid stream, a turbulent motion with a predominantly axial direction of motion, i.e., parallel to the main axis of the premixing chamber 17. The injector 19 comprises an inlet chamber 20 and a body 21 having a substantially cylindrical shape and provided with a duct 22 which preferably has a frusto-conical shape tapering towards the inside of the chamber 17. One end of the duct 22 is connected to the inlet chamber 20, while the other end enters the premixing chamber 17. Preferably, the injector 19 enters the chamber 17 so that the end of the duct 22 does not reach beyond the inlet hole 23 for the secondary fluid, so as to avoid hindering, with a mechanical obstacle, the flow of the secondary fluid inside the premixing chamber 17. The diameter of the duct 22 at the end that is connected to the inlet chamber 20 is generally between 5 and 200 mm, preferably between 10 and 100 mm, while the diameter of the duct 22 at the end inserted in the premixing chamber 17 is generally between 2 and 60 mm, preferably between 5 and 40 mm.

A diffuser 24 is preferably inserted at the inlet hole 23 for the secondary fluid; said diffuser preferably has a structure which is similar to that of the above-described diffuser 3 and allows to impart to the stream of secondary fluid that enters the premixing chamber 17 a motion in a substantially perpendicular direction with respect to the secondary axis of the premixing chamber 17, so as to obtain a turbulent motion with a predominantly helical orientation, similar to the motion provided by the diffuser 3 for the stream of mixture that enters the emulsification chamber 1.

The diffuser 24 comprises a hollow cylindrical body 26 and, preferably, an inlet chamber 25 which is also generally substantially cylindrical and is connected to one end of the cylindrical body 26, preferably by means of a connecting portion which has a frusto-conical shape. On the side wall of the cylindrical body 26 through holes 27 are provided which have a radial axis. One end 28 of the cylindrical body 26 is connected to the inlet chamber 25, while the other end 29 is closed. Preferably, the through holes 27 are arranged along at least two, preferably three or four, generatrices of the cylindrical body 26 which are arranged symmetrically with respect to the axis of the cylindrical body 26. The dimensions of the diffuser 24 and of the holes 27 can vary within limits which are substantially identical to those cited for the diffuser 3.

The axis of each through hole 27 is substantially perpendicular to the axis of the cylindrical body 26. The expression "substantially perpendicular" means that the axis of each through hole forms, with respect to a plane which is perpendicular to the axis of the cylindrical body, an angle between −20° and +20°, preferably between −10° and +10°.

Preferably, the axis of the through holes 27 is inclined towards the inside of the premixing chamber 17. It is believed that this facilitates quicker mixing of the fluids, particularly if they have significantly different viscosities.

The outlet hole 30 of the premixing chamber has a conveyance device 31 for mixture to be sent into the emulsification chamber 1. Said conveyance device 31 comprises an outlet chamber 32 and a substantially cylindrical body 33 provided with a duct 34 which preferably has a frusto-conical shape tapering towards the outside of the chamber 17. One end of the duct 34 is connected to the outlet chamber 32, while the other end enters the premixing chamber 17. Preferably, the conveyor 31 enters the chamber 17 so that the end of the duct 34 does not protrude beyond the inlet hole 23 for the secondary fluid, so as to avoid interfering, by means of a mechanical obstacle, with the flow of the secondary fluid inside the premixing chamber 17. The diameter of the duct 34 at the end that is connected to the outlet chamber 32 is generally between 2 and 60 mm, preferably between 5 and 40 mm, while the diameter of the duct 34 at the end that is inserted in the premixing chamber 17 is generally between 5 and 200 mm, preferably between 10 and 100 mm.

In a preferred embodiment, the premixing chamber 17 further comprises a heating device (not shown in FIG. 2) constituted for example by electric resistors connected to a thermostat or by a heating device such as the one disclosed in EP-731 623. The latter comprises a heating cable constituted by at least two conductors sheathed with a semiconducting polymeric material (for example polyvinyl chloride with carbon black as filler) and surrounded with a microcrystalline siliceous material. The siliceous material can be converted into a compact mass by mixing with a thermosetting epoxy resin in which the entire heating device can be embedded. Said device is capable of self-adjusting its temperature, allowing to maintain constant and uniform heating with low electric power consumption.

Heating the premixing chamber 17 is particularly advantageous if fluids whose viscosity decreases considerably as the temperature decreases (for example high-density fuel oils with a high paraffin content) are fed into said chamber. After a period of inactivity and before restarting the production cycle, the fluids that remain in the premixing chamber are heated to a suitable temperature which achieves sufficient fluidity and thus avoids pressure surges when fluid feed restarts.

Figure 3:
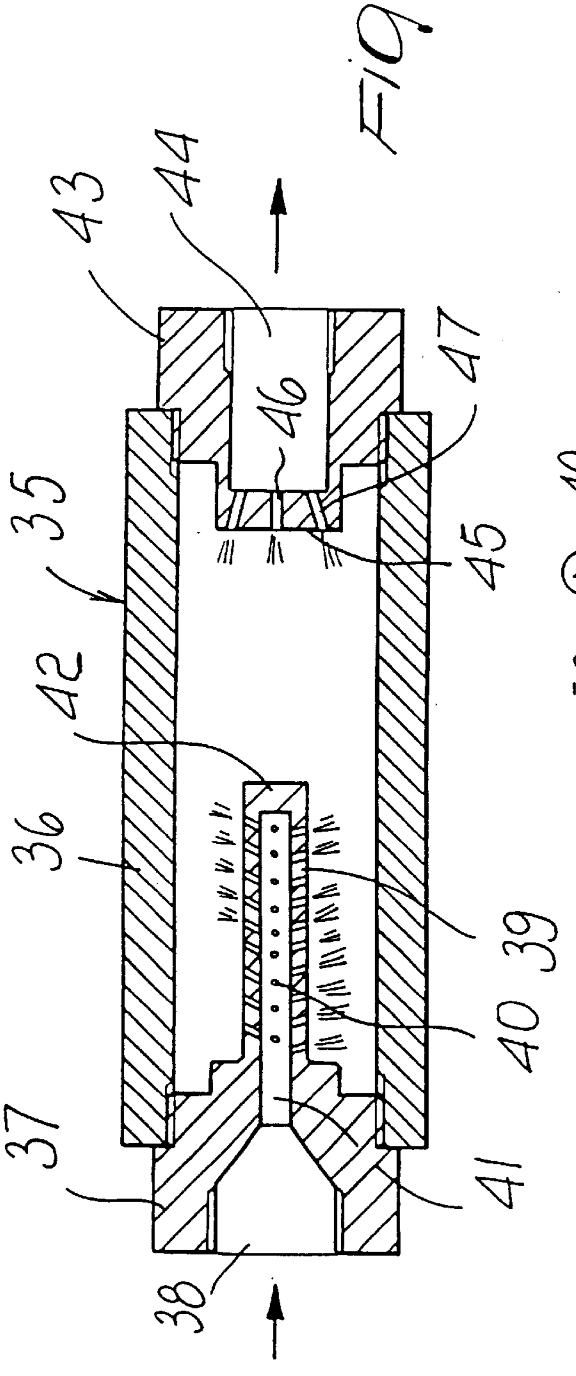
FIG. 3 is a longitudinal sectional view of the compensation chamber.

With reference to FIG. 3, the compensation chamber 35 is constituted by a preferably cylindrical hollow body 36. At one end of the hollow body 36 an inlet is provided for the emulsion arriving from the emulsification chamber 1, preferably provided with a diffuser 37 whose structure is preferably similar to that of the diffuser 3 provided in the emulsification chamber 1. The diffuser 37 comprises a hollow cylindrical body 39 and, preferably, an inlet chamber 38 which is also substantially cylindrical and is connected to one end of the cylindrical body 39, preferably by means of a frusto-conical connecting portion. On the side wall of the cylindrical body 39 through holes 40 are provided which have a radial axis. One end 41 of the cylindrical body 39 is connected to the inlet chamber 38, while the other end 42 is closed. Preferably, the through holes 40 are arranged along at least two, preferably three or four, generatrices of the cylindrical body 39 which are arranged symmetrically with respect to the axis of the cylindrical body 39. The dimensions of the diffuser 37 and of the through holes 40 can vary within limits which are substantially identical to those cited for the diffuser 3.

The axis of each through hole 40 is substantially perpendicular to the axis of the cylindrical body 39. The expression "substantially perpendicular" means that the axis of each through hole forms, with respect to a plane which is perpendicular to the axis of the cylindrical body, an angle between −20° and +20°, preferably between −10° and +10°.

In order to facilitate the output flow of the produced emulsion, the axis of the through holes 40 is preferably inclined away from the emulsion inlet of the compensation chamber 35.

At the other end of the hollow body 36 a conveyance device 43 is provided which comprises a hollow body 44 which is substantially cylindrical and whose axis is parallel to the main axis of the compensation chamber 35; one end of said body is open, while the other end is provided with a preferably circular perforated plate 45 which is arranged perpendicularly to the main axis of the compensation chamber. The plate 45 has at least one through hole through which the emulsion flows out. Preferably, the plate 45 has a centrally arranged through hole 46 and a plurality of through holes 47 which are arranged peripherally, preferably symmetrically with respect to the hole 46. As an alternative, the plate is provided with a plurality of through holes arranged along two circles which are concentric with respect to the center of said plate.

The diameter of the through holes 46, 47 is predetermined according to the viscosity of the emulsion being produced, to the pressure of the fluid in output and to the productivity required to the system.

Figure 4:
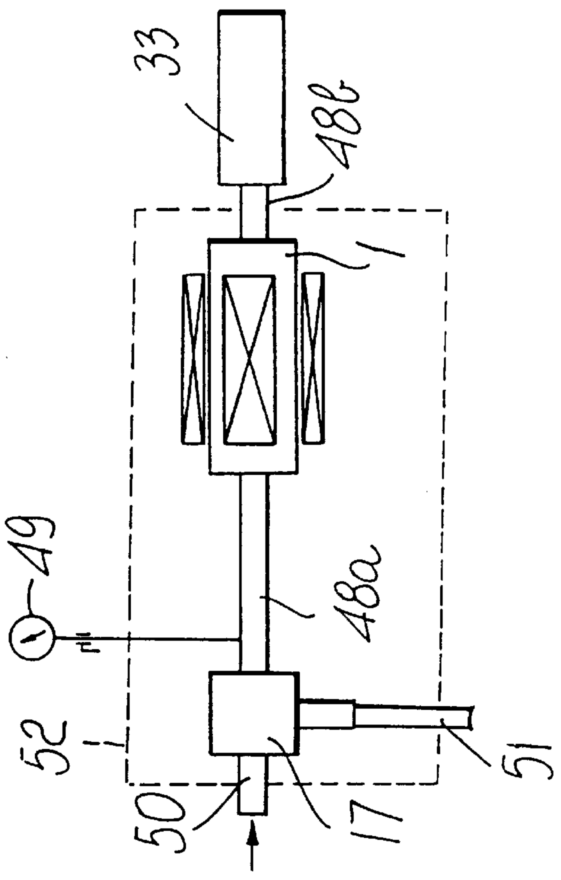
FIG. 4 is a schematic view of an embodiment of the apparatus according to the present invention comprising an emulsification chamber, a premixing chamber and a compensation chamber which are mutually sequentially connected.

FIG. 4 is a schematic view of an embodiment of the apparatus for producing emulsions according to the present invention. It comprises sequentially: a premixing chamber 17, an emulsification chamber 1 and a compensation chamber 35. The various parts of the apparatus are mutually connected by means of ducts 48*a*, 48*b* which are optionally provided with means for controlling the pressure of the fluids 49, particularly the duct 48*a* that connects the premixing chamber 17 to the emulsification chamber 1.

The primary fluid and the secondary fluid enter the premixing chamber 17 through the duct 50 and the duct 51, respectively; said ducts are connected to pumping devices (not shown in FIG. 4) such as, for example, electric gear pumps provided with an adjustable bypass or single- or multiple-piston electric pumps, impulse pumps, rotary pumps, multiple swash-plate pumps, or similar devices.

The pumping devices for the secondary fluid are preferably constituted by an electric dosage pump of the plunger piston type, which allows highly accurate dosage of the amount of secondary fluid to be fed into the system because it feeds the fluid in predetermined and constant amounts without being affected by any variations in the pressure inside the system. The electric dosage pump can be of the single-piston type or of the type with two pistons in phase opposition. The second case avoids pulses in the emulsion stream that leaves the apparatus, caused by the reciprocating motion of the piston that feeds the secondary fluid.

The pumping devices for the primary fluid are preferably constituted by a pump whose delivery varies as the internal pressure of the apparatus varies, for example a gear pump or a rotary pump.

The secondary fluid inlet duct 51 is preferably provided with a check valve (not shown in FIG. 4), which is mainly meant to avoid contaminations of the duct 51 by the primary fluid.

Devices for extracting the produced emulsion are generally provided on the duct that leaves the apparatus according to the present invention (not shown in FIG. 4). Said devices are preferably constituted by a valve which allows to adjust the flow-rate of the output emulsion stream. The adjustment of said valve, combined with the use of the above-mentioned pumping devices for the primary fluid and for the secondary fluid, allows to simply and effectively provide continuous control of the composition of the produced emulsion. By adjusting the flow-rate of the output stream, the internal pressure is changed and therefore the delivery of the pump that feeds the primary fluid is also changed. Since the electric plunger piston pump feeds an amount of secondary fluid which is constant over time, a variation in the delivery of the primary fluid feed pump corresponds to a variation in the composition of the produced emulsion. Once a setting curve has been determined, it is therefore possible to continuously control the composition of the produced emulsion by adjusting the output valve. This control can be provided manually or automatically.

The pressure applied to the primary fluid entering the premixing chamber is generally between a minimum of 5 bar and a maximum of 400 bar, preferably between 10 and 100 bar, while the pressure between the premixing chamber 17, and the emulsification chamber 1 is generally kept at values of no less than 5 bar, preferably between 10 and 30 bar, The various parts of the apparatus according to the present invention can be made of metal, particularly of a steel which is resistant to the mechanical and chemical action of the fluids that flow through said apparatus. In particularly, if a magnetic field is applied to the emulsification chamber, the walls of said chamber are preferably made of nonmagnetizable steel, while the diffuser 3 and the conveyance device 10 are preferably made of magnetizable steel. In this manner, the diffuser 3 and the conveyance device 10, by acting as poles of the magnetic system, allow to distribute the lines of force of the magnetic field over the entire volume of the emulsification chamber, with an increase in strength in the central region of said chamber.

The premixing chamber 17 and the emulsification chamber 1 can optionally be inserted in a containment casing 52 made for example of a resin which is flame-resistant and resistant to chemicals, or made of stainless steel.

According to the required productivity and to the nature and number of fluids used, the apparatus according to the present invention can be provided in configurations which differ from the one shown in FIG. 4. For example, in order to increase productivity it is possible to use a plurality of emulsification chambers operating in parallel, while particularly in the case of particularly incompatible fluids to be emulsified it can be advantageous to use at least two emulsification chambers operating in series. This, while maintaining the same quality of the produced emulsion, avoids the need to pass the fluids through the system several times, and therefore overall productivity is increased. It is also possible to use at least two premixing chambers operating in series, for example if a plurality of different secondary fluids have to be fed. If any flow-rate oscillation in the output emulsion stream is to be avoided (for example in direct-combustion systems as described hereinafter), it is also possible to use at least two compensation chambers operating in series. This embodiment can be particularly advantageous if a plurality of secondary fluids, each fed by means of plunger piston electric pumps, are used.

As mentioned earlier, the apparatus according to the present invention can be used advantageously to produce emulsions or microemulsions of liquid fuels and water, to be used for combustion processes in general, particularly for internal-combustion engines, particularly for Diesel engines, for heating or steam generation plants, for incinerator furnaces, for turbine generators, etcetera.

Although particular reference is made, in the present description, to emulsions in which the water is dispersed in a liquid fuel, the apparatus according to the present invention can be used to produce emulsions of other kinds, constituted for example by a water-insoluble product dispersed in a water phase, or in any case emulsions meant to be used in fields other than combustion, for example in the food or pharmaceutical field or to prepare pigments for paints and varnishes, or fireproof or fire-fighting products, and the like.

With reference to emulsions of a liquid fuel with water, the liquid fuel is the main component of the primary fluid, while the secondary fluid is mainly constituted by water.

Hydrocarbons derived from petroleum, such as gas oil, Diesel fuel, kerosene, fuel oil and the like, can be used as liquid fuels. In particular, the apparatus according to the present invention can be used advantageously to produce emulsions of water and a petroleum product whose density (at 20° C.) is generally higher than 0.80 kg/dm$^3$, preferably between 0.83 and 1 kg/dm$^3$. Said petroleum products generally have a viscosity between 0.5° E (at 0° C.) and 300° E (at 100° C.), preferably between 1° E (at 0° C.) and 100° E (at 100° C.), although the apparatus according to the present invention can also be used with fuels having higher viscosities (up to 350° E at 150° C.), so long as the emulsion process is performed at a temperature which allows to achieve sufficient fluidity for the fuel, so as to allow to feed it into the apparatus.

The water phase can be constituted by water from the mains or from recycling as such, or by demineralized or deionized water or also by wastewater from a technological process.

The emulsions of liquid fuel and water can receive the addition of additives of various kinds, such as surfactants, antifreeze additives, lubricants, cetane improvers, additives suitable to reduce sulfur oxide emissions, etcetera. These additives can be sent directly to the apparatus, for example by means of an additional inlet provided in the premixing chamber, or can preferably be conveyed, according to their solubility characteristics, through the water phase or the petroleum phase.

In particular, in order to increase the stability of the produced emulsions it is possible to use surfactants or mixtures of surfactants known in the art. Said surfactants are preferably chosen among those which have low environmental impact, do not generate toxic byproducts during combustion and are not corrosive for the metals with which they make contact. Said surfactants can be preferably chosen among: sorbitol esters with fatty acids, optionally containing at least one polyoxyalkylene chain, preferably a polyoxyethylene chain; polyalkylene glycols, preferably polyethylene glycol; polyalkylene glycol esters with fatty acids; or mixtures thereof. The fatty acids can be chosen in particular among stearic acid, lauric acid, oleic acid or palmitic acid. The following are particularly preferred surfactants: sorbitan monoleate, sorbitan sesquioleate, sorbitan monolaurate, polyoxyethylene sorbitan monostearate, polyethyleneglycol hydroxystearate, and the like, or mixtures thereof.

The use of surfactants is particularly advantageous in the case of emulsions of low-density, low-viscosity liquid fuels, for example Diesel fuels, which typically have a density between 0.83 and 0.87 kg/dm$^3$ and a viscosity between 1 and 3° E (at 0° C.), which in the absence of surfactants generally form emulsions that show stability problems after prolonged storage in a tank, particularly due to the separation of the lighter petroleum fractions. For Diesel fuels it has been observed that it is particularly advantageous to use a mixture of surfactants comprising 60 to 95% sorbitan monoleate by weight and 5 to 40% polyethyleneglycol hydroxystearate by weight. This mixture, in addition to stabilizing the emulsions that are produced, also acts as a lubricant and an antifreeze.

The total amount of surfactants added is selected according to the type of fuel and to the effectiveness of said surfactants in stabilizing the emulsion and can generally vary between 0.1 and 8% by weight, preferably between 0.5 and 5% by weight, with respect to the weight of the total emulsion.

In the case of liquid fuels having a higher density, the Applicant has instead observed that it is possible to obtain highly stable emulsions even without adding surfactants. This result can be ascribed both to the density and viscosity characteristics of the liquid fuel and to the possible presence, in said fuel, of small amounts of hydrocarbon oxidation products, which can act as surfactants.

Additives suitable to reduce sulfur oxide emissions, such as for example sodium or potassium hydroxide, soluble barium or magnesium salts (for example chlorides), or mixtures thereof, can be introduced by means of the water phase. The presence of said products is particularly advantageous if fuels with a high sulfur content are used. The amount of additive to be added is determined beforehand substantially according to the stoichiometric ratios required to eliminate a predetermined amount of sulfur, which is in turn calculated as the difference between the amount of sulfur present in the fuel and the maximum allowable amount of sulfur in the exhaust gases.

The apparatus according to the present invention allows to produce liquid fuel emulsions in which the amount of water can vary over a wide range and is predetermined according to the specific use for which the emulsion is intended. For combustion processes in general, the amount of water can vary between 5 and 45% by weight, preferably between 10 and 35% by weight, with respect to the total weight of the emulsion.

In the case of heat and/or steam generating plants, the apparatus according to the present invention can be used to feed both direct-combustion plants and indirect-combustion plants. In the first case, the fuel/water emulsion is sent directly to a burner (of the nonmodulating type) and the apparatus according to the present invention ensures high reliability and uniformity in the quality of the produced emulsion and therefore stability in the operation of the burner. In the second case, the produced emulsion is initially sent to an accumulation tank and is then fed to a burner (of the modulating type) and the apparatus according to the present invention is capable of producing highly stable emulsions, such as to avoid phase separations inside the tank also after long storage periods.

These stability characteristics are essential also in case of emulsions to be used to supply Diesel engines, for which a storage period is expected during production (for example in large tanks), during shipping and distribution (for example in tank trucks and in depots of distribution facilities) and during final use (in the tanks of motor vehicles).

Emulsions having the composition listed in Table 1 were prepared by using the above-described apparatus (FIGS. 14):

TABLE 1

| | Composition (% by weight) | | |
|---|---|---|---|
| Emulsion | Hydrocarbon | Water | Additive |
| A | 88.0 | 10.0 | 2.0 |
| B | 86.0 | 11.5 | 2.5 |
| C | 88.0 | 10.0 | 2.0 |
| D | 66.0 | 34.0 | — |

For emulsions A, B and C, the hydrocarbon used was automotive Diesel fuel with a density of 0.836 kg/dm$^3$, while emulsion D was prepared by using fuel oil with a density of 0.95 kg/dm$^3$. Emulsions A, B and C contained, as stabilizing additive, a mixture constituted by 90% sorbitan monoleate by weight and 10% polyethyleneglycol hydroxystearate by weight, while no surfactants were added to emulsion D. While emulsions A, B and D were prepared in the presence of a magnetic field inside the emulsification chamber (with a strength of approximately 11000 kOe, generated by means of pressure die-cast and sintered lanthanum 120 oxide permanent magnets with a density of 7.3 g/CM$^3$), emulsion C was prepared in the absence of a magnetic field.

The emulsions were subjected to stability tests by centrifuging for 5 minutes at increasing speeds equal to 200, 400, 600, 800 and 1000 g (g=acceleration of gravity) for a total time of 25 minutes. At the end of centrifuging at 1000 g, emulsion D showed no phase separation, while the test tubes that contained emulsions A, B and C showed: at the bottom, a very small trace of water (approximately 0.15% of the total volume); in the central region, a milk-white emulsified phase with a volume equal to approximately 5–6% of the total volume; and in the remaining part, an emulsion which was fully similar in appearance to the initial emulsion.

Examination under an optical microscope (magnification 1250×) showed that the initial emulsion and the centrifuged emulsion had the same structure, with a continuous phase in which the water phase was dispersed in the form of particles having an average size of less than 0.5 μm. The whitish emulsion present in the central region showed a structure which was very similar to the initial emulsion but had a higher concentration of water-phase particles. Complete rehomogenization of the emulsion was observed by simple agitation.

The samples were also examined after centrifuging at the intermediate speeds. At 400 g, all samples already had the above-described final appearance, but with different proportions as regards the central region. In particular, emulsions A and B had a whitish central region having approximately 30% of the volume obtained at 1000 g, while for emulsion C the central region already had 90% of the final volume at 1000 g.

As a comment to the above findings, it is noted that the emulsions produced according to the present invention show high stability also after centrifuging at 1000 g, with negligible water separation, and form a central region which is structurally identical to the initial emulsion except for a higher water content. The emulsion reacquires its original homogeneity after bland agitation.

As regards the influence of the magnetic field on the quality of the emulsion, the tests conducted showed no substantial differences except for the fact that the emulsion prepared in the absence of a magnetic field had a slightly higher separation rate for the various phases than the emulsion having the same composition prepared in the presence of the magnetic field.

In order to evaluate the quality of the emulsions produced with the process according to the present invention from the point of view of their utilization in combustion processes, test runs were conducted with a Diesel engine fueled with a fuel/water emulsion produced with the above-described apparatus. In particular, both the performance of the engine and the composition of the emissions were evaluated and compared with Diesel fuel as is. The liquid fuel used was Diesel fuel of the AGIP brand, with a density of 0.839 kg/dm$^3$. Demineralized water, with the addition of a mixture constituted by 90% sorbitan monoleate by weight and 10% polyethyleneglycol hydroxystearate by weight, was used as water phase. Different emulsions with a water content between 8.9 and 17.7% by weight were evaluated. The compositions are listed in Table 2 (the percentages by weight are referred to the total weight of the emulsion).

The tests used an industrial turbocharged Diesel engine known as VM SUN/E 6105 T having the following characteristics:

| | |
|---|---|
| Displacement: | 5972 cm$^3$ |
| Number of cylinders: | 6, in line |
| Bore/stroke: | 105/115 mm |
| Injection type: | direct |
| Injection pressure: | 280 bar |

As regards the evaluation of the performance of the engine, the tests were conducted fully loaded and with a rpm rate which decreased from 2400 to 1100 rpm in steps of 100 rpm. The results are listed in Table 3, which also lists the percentage change with respect to Diesel fuel as is (Sample 1). Table 4, instead, lists fuel consumptions in terms of total consumption (i.e., in relation to the total amount of emulsion utilized) and in terms of actual consumption (i.e., in relation to the amount of Diesel fuel actually used, which is obtained from the total consumption on the basis of the compositions listed in Table 2). The data listed in Tables 3 and 4 show that the loss of torque and power of the engine, with respect to Diesel fuel as is, is in any case smaller than the amount of water that is present in the emulsion, and that for an equal developed power the engine fueled with the emulsion burns less Diesel fuel. The decrease in actual consumption of Diesel fuel can be ascribed to an improvement in the efficiency of the thermal combustion energy conversion process performed by the engine.

TABLE 2

| | Composition (%) by weight) | | |
|---|---|---|---|
| Sample | Diesel fuel | Water | Additive |
| 1 | 100 | — | — |
| 2 | 89.3 | 8.9 | 1.8 |
| 3 | 86.2 | 12.1 | 1.7 |
| 4 | 84.6 | 13.5 | 1.9 |
| 5 | 83.2 | 15.0 | 1.8 |
| 6 | 80.5 | 17.7 | 1.8 |

TABLE 3

| Sample | Maximum power (kW) | % Change | Maximum torque (N.m) | % Change |
|---|---|---|---|---|
| 1 | 113 | — | 516 | — |
| 2 | 104 | −8.0 | 477 | −7.5 |
| 3 | 104 | −8.0 | 477 | −7.5 |
| 4 | 100 | −11.5 | 467 | −9.5 |
| 5 | 103 | −8.0 | 475 | −8.0 |
| 6 | 95 | −16.0 | 453 | −12.0 |

TABLE 4

| Sample | Total consumption (g/kW.h) | % Change | Actual consumption (g/kW.h)) | % Change |
|---|---|---|---|---|
| 1 | 228.5 | — | 228.5 | — |
| 2 | 250.8 | +9.7 | 224.0 | −2.0 |
| 3 | 251.3 | +10.0 | 216.6 | −5.2 |
| 4 | 258.1 | +13.0 | 218.3 | −4.4 |
| 5 | 253.5 | +10.9 | 210.9 | −7.6 |
| 6 | 272.2 | +19.5 | 219.1 | −4.1 |

As regards emissions, a comparison was made between Diesel fuel as such (Sample 1) and a fuel/water emulsion containing 13.5% water (Sample 4). The test was conducted according to the ISO 8178 Type C1 standard on the same test-bed engine used earlier, on which performance, smoke density and emissions of carbon monoxide (CO), unburnt hydrocarbons (HC), nitrogen oxides ($NO_x$) and particulate matter (PM) were measured. In order to simulate real-life operation of the engine, these measurements were taken in eight different steady-state operating modes with constant load and rpm rate, assigning a different weight to each mode. As regards pollutant emissions, the final result is expressed in g/(kW.h) as a ratio between the sum of emitted quantities and the sum of delivered power, while smoke density was determined by means of an opacimeter and expressed in Bosch degrees. The results, listed in Table 5, show that a small increase in hydrocarbon emission is offset by a considerable drop in smoke density and in emissions of nitrogen oxide and particulate matter.

TABLE 5

| Emissions | Diesel fuel (g/kW.h)) | 13.5% $H_2O$ Emulsion (g/kW.h)) | % Change |
|---|---|---|---|
| CO | 2 | 2.001 | 0 |
| HC | 0.272 | 0.291 | +7 |
| $NO_x$ | 7.736 | 6.579 | −15 |
| PM | 0.445 | 0.289 | −35 |
| Smoke density | 1.95 | 1.18 | −39 |

What is claimed is:

1. An apparatus for producing an emulsion of at least one primary fluid with at least one secondary fluid, said fluids being substantially mutually immiscible, comprising an emulsification chamber provided with an inlet for said fluids, and with an outlet for said emulsion, said inlet being arranged along a main-axis of said emulsification chamber;

characterized in that said inlet comprises a diffuser provided with an inlet hole whose axis is substantially parallel to said main axis and with an outlet hole whose axis is substantially perpendicular to said main axis.

2. An apparatus according to claim 1, wherein said diffuser comprises a hollow cylindrical body, through holes having a radial axis being provided on the side wall of said cylindrical body, said cylindrical body having one end which is connected to said inlet and another end which is closed.

3. An apparatus according to claim 2, wherein said diffuser comprises an inlet chamber which is connected to one end of the cylindrical body.

4. An apparatus according to claim 2, wherein the through holes are arranged along at least two generatrices of the cyclindrical body which are arranged symmetrically with respect to the axis of the cyclindrical body.

5. An apparatus according to claim 1, wherein at the outlet of the emulsification chamber an emulsion conveyance device is present which has an inlet hole whose axis is substantially perpendicular to the main axis of the emulsification chamber and an outlet hole whose axis is substantially parallel to said main axis.

6. An apparatus according to claim 5, wherein said conveyance device comprises a cylindrical hollow body, through holes having a radial axis being provided on the side wall of said cylindrical body, said cylindrical body having an end which is connected to said inlet and another end which is closed.

7. An apparatus according to claim 6, wherein said conveyance device comprises an inlet chamber which is connected to one end of the cylindrical body.

8. An apparatus according to claim 6, wherein the through holes are arranged along at least two generatrices of the cylindrical body which are arranged symmetrically with respect to the axis of the cylindrical body.

9. An apparatus according to claim 5, wherein said diffuser and said conveyance device are arranged along the main axis of the emulsification chamber in a mirror-symmetrical position with respect to each other.

10. An apparatus according to claim 1, wherein the internal surface of the emulsification chamber is cylindrical and has a helical groove with a predetermined depth and pitch.

11. An apparatus according to claim 1, further comprising a premixing chamber which is provided with an inlet for the primary fluid, an inlet for the secondary fluid and an outlet for the resulting mixture, said outlet being connected to the inlet of the emulsification chamber.

12. An apparatus according to claim 11, wherein the mixture outlet and the primary fluid inlet are arranged along a main axis of said premixing chamber, while the secondary fluid in let is arranged along a secondary axis of said premixing chamber which is substantially perpendicular to said main axis.

13. An apparatus according to claim 11, wherein the inlet for the primary fluid is provided with an injector suitable to impart to the stream of primary fluid a motion in a direction which is substantially parallel to said main axis of the premixing chamber.

14. An apparatus according to claim 11, wherein the secondary fluid inlet comprises a diffuser provided with an inlet hole whose axis is substantially parallel to said secondary axis and with an outlet hole whose axis is substantially perpendicular to said secondary axis.

15. An apparatus according to claim 14, wherein said diffuser comprises a hollow cylindrical body, through holes having a radial axis being provided on the side wall of said cylindrical body, said cylindrical body having an end which is connected to said inlet and another end which is closed.

16. An apparatus according to claim 15, wherein said diffuser comprises an inlet chamber which is connected to one end of the cylindrical body.

17. An apparatus according to claim 15, wherein the through holes are arranged along at least two generatrices of the cylindrical body which are arranged symmetrically with respect to the axis of the cyclindrical body.

18. An apparatus according to claim 11, wherein the premixing chamber further comprises a heating device suitable to decrease the viscosity of the fluids fed into the premixing chamber.

19. An apparatus according to claim 1, further comprising a compensation chamber which is provided with an inlet and with an outlet which are arranged along a main axis of said compensation chamber, said inlet being connected to the emulsion outlet of the emulsification chamber.

20. An apparatus according to claim 19, wherein the outlet of said compensation chamber is provided with a conveyance device comprising a substantially cylindrical hollow body in which one end is open and another end is provided with a perforated plate arranged perpendicularly to the main axis of the compensation chamber.

21. An apparatus according to claim 19, wherein the inlet of said compensation chamber is provided with a diffuser which has an inlet hole whose axis is substantially parallel to said main axis and an outlet hole whose axis is substantially perpendicular to said main axis.

22. An apparatus according to claim 21, wherein said diffuser comprises a hollow cylindrical body, through holes having a radial axis being provided on the side wall of said cylindrical body, said cylindrical body having an end which is connected to said inlet and another end which is closed.

23. An apparatus according to claim 22, wherein said diffuser comprises an inlet chamber which is connected to one end of the cylindrical body.

24. An apparatus according to claim 22, wherein the through holes are arranged along at least two generatrices of the cyclindrical body which are arranged symmetrically with respect to the axis of the cylindrical body.

25. An apparatus according to claim 1, further comprising a device suitable to produce a magnetic field inside said emulsification chamber.

26. A system for producing an emulsion of at least one primary fluid with at least one secondary fluid, said fluids being substantially immiscible with each other, said system comprising:

(a) an apparatus for producing the emulsion, said apparatus comprising an emulsification chamber provided with an inlet for said fluids and with an outlet for the produced emulsion, said inlet being arranged along a main axis of said emulsification chamber;

(b) devices for pumping the primary fluid and the secondary fluid into the apparatus;

(c) devices for extracting the emulsion that leaves the apparatus;

characterized in that said inlet of the emulsification chamber comprises a diffuser provided with -an inlet hole whose axis is substantially parallel to said main axis and with an outlet hole whose axis is substantially perpendicular to said main axis.

27. A system according to claim 26, further comprising an accumulation tank for the produced emulsion.

28. A system according to claim 26, wherein the primary fluid consists essentially of a liquid fuel, while the secondary fluid consists essentially of water.

* * * * *